(12) United States Patent
Cantz

(10) Patent No.: US 11,476,015 B2
(45) Date of Patent: Oct. 18, 2022

(54) LIQUID COOLED CABLE AND CHARGING CABLE ASSEMBLY

(71) Applicant: HUBER+SUHNER AG, Herisau (CH)

(72) Inventor: Thomas Cantz, Stafa (CH)

(73) Assignee: HUBER+SUHNER AG, Herisau (CH)

( * ) Notice: Subject to any disclaimer, the term of this patent is extended or adjusted under 35 U.S.C. 154(b) by 0 days.

(21) Appl. No.: 17/325,917

(22) Filed: May 20, 2021

(65) Prior Publication Data

US 2021/0407706 A1    Dec. 30, 2021

(30) Foreign Application Priority Data

Jun. 26, 2020 (DE) .......................... 102020003868.9

(51) Int. Cl.
| | |
|---|---|
| *H01B 7/42* | (2006.01) |
| *B60L 53/302* | (2019.01) |
| *B60L 53/18* | (2019.01) |
| *F16L 11/118* | (2006.01) |
| *H01B 5/10* | (2006.01) |

(52) U.S. Cl.
CPC .............. *H01B 7/423* (2013.01); *B60L 53/18* (2019.02); *B60L 53/302* (2019.02); *F16L 11/1185* (2013.01); *H01B 5/101* (2013.01)

(58) Field of Classification Search
CPC .......... H01B 7/34; H01B 7/421; H01B 7/423; H01B 7/20336; H01B 9/00; H01B 9/006; H01B 13/005
USPC ..................................... 174/27, 29, 47, 68.1
See application file for complete search history.

(56) References Cited

U.S. PATENT DOCUMENTS

| | | | |
|---|---|---|---|
| 3,603,715 A * | 9/1971 | Eilhardt ................. | H01B 12/06 174/15.5 |
| 3,772,454 A | 11/1973 | Donecker et al. | |
| 4,310,718 A * | 1/1982 | Eng ........................ | H01B 9/001 174/15.7 |
| 4,647,712 A * | 3/1987 | Alloin ................... | H01B 13/143 174/15.7 |
| 6,100,467 A | 8/2000 | Kroulik | |
| 6,472,614 B1 * | 10/2002 | Dupont ................ | H01B 7/0072 138/110 |
| 2009/0178825 A1 * | 7/2009 | Wu ......................... | H01B 7/425 174/113 R |
| 2017/0338006 A1 * | 11/2017 | Gontarz ................ | H01R 13/005 |

(Continued)

FOREIGN PATENT DOCUMENTS

| | | |
|---|---|---|
| CN | 106448852 A | 2/2017 |
| WO | WO 2017/133893 A1 | 8/2017 |
| WO | WO 2020/064040 A1 | 4/2020 |

OTHER PUBLICATIONS

EPO, English language version of the extended European search report for European Patent Application No. 21173724.2-1201, dated Oct. 13, 2021 (9 pages).

*Primary Examiner* — William H. Mayo, III
(74) *Attorney, Agent, or Firm* — Pauley Erickson & Swanson

(57) ABSTRACT

A liquid cooled cable (1) includes a conductor (2) with at least two cable strands (3). The conductor (2) is encompassed by a hose (5) spaced in a sectional view at least partially apart from the conductor (2) by an interstitial space (6). The interstitial space (6) is arranged between an inner wall (7) of the hose (5) and the cable strands (3) of the conductor (2). The interstitial space (6) conducts a cooling liquid (15) along the conductor (2).

15 Claims, 3 Drawing Sheets

(56) References Cited

U.S. PATENT DOCUMENTS

| | | | |
|---|---|---|---|
| 2018/0158572 A1* | 6/2018 | Ernst | B60L 53/18 |
| 2019/0131035 A1* | 5/2019 | Fuhrer | H01B 7/421 |
| 2019/0164665 A1* | 5/2019 | Sato | H01B 7/42 |
| 2019/0221330 A1* | 7/2019 | Fuehrer | G01R 27/16 |
| 2019/0237218 A1* | 8/2019 | Heyne | B60L 53/16 |

* cited by examiner

LIQUID COOLED CABLE AND CHARGING CABLE ASSEMBLY

CROSS-REFERENCE TO RELATED APPLICATION

German Patent Application No. DE 102020003868.9, filed 26 Jun. 2020, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present disclosure relates to a liquid cooled cable and a charging cable assembly comprising such a liquid cooled cable for charging of electric vehicles.

Discussion of Related Art

WP20064040A1 was first published in March 2020 on behalf of Leoni Kabel GmbH. It is directed to an electric stranded wire which can be cooled using a coolant. The electric stranded wire comprises a core element and a cover element. The core element of the electric stranded wire is formed from first strands and second strands, wherein a particularly advantageous arrangement of the first strands and of the second strands form free regions within the cover element. Said free regions can be used for the efficient cooling of the electric stranded wire.

CN106448852A was first published in February 2017 on behalf of Yangzhou Fengming Cable Co. Ltd. The disclosure is directed to a mining cable. The mining cable comprises three stranded cable cores, a water blocking tape, an armor layer and a sheath layer. The three stranded cable cores are uniformly distributed along the periphery of a strengthening, core. A stranded strengthening part is arranged in a gap between adjacent stranded cable cores.

WO17133893A1 was first published in August 2017 on behalf of the same applicant. It is directed to a cable assembly, comprising a cable with a cable hose and at least one conductor arranged therein. The cable hose is spaced a distance apart from the conductor forming a first interstitial space between the at least conductor and the cable hose. Furthermore, the disclosure is directed to at least one tube for conveying of a cooling fluid and a connector comprising at least one contact member interconnected to the at least one conductor. A chamber comprises a first port which is interconnected to the first interstitial space between the at least one conductor and the cable hose and a second port which is interconnected to the at least one tube.

U.S. Pat. No. 6,100,467A was first published in August 2000 on behalf of Northern Cable and Automation LLC. The disclosure is directed to a water cooled electrical cable that includes a plurality of electrical conductors. A first terminal half includes a first wire pocket hole and a fluid port disposed in fluid communication with the first wire pocket hole. A first crimp tube disposed within and extending from the first wire pocket hole is crimped around one-half of the electrical conductors associated, with a first polarity. A second terminal half includes a second wire pocket hole and a fluid port disposed in fluid communication with the second wire pocket hole. The second terminal half is connected with the first terminal half. A second crimp tube disposed within and extending from the second wire pocket hole is crimped around a remaining one-half of the plurality of electrical conductors associated with a second polarity.

U.S. Pat. No. 3,772,454A was first published in November 1973 on behalf of USX A Corp. of DE Corp. The disclosure is directed to a torque balanced conductor cable which includes between three and six strands spiraled together with the torque exerted by the cable being approximately equal to the torque exerted by the strands. Each strand includes an insulated conductor as a core with steel wires stranded there around and the insulation extending into the interstices of the strands. Another species includes insulated conductors positioned in the outer valleys of the cable and a sheath extruded over the entire assembly. This second species may be used with the first species or with cables in which the strands have a steel wire core member.

SUMMARY OF THE INVENTION

To reduce charging time, charging cables and connectors (charging cable assemblies) for electric vehicles are usually required to transmit as much electrical power per time as possible to recharge a vehicle battery in a short period of time. To fulfill this requirement, at a given voltage, this requires high currents which tend to heat the conductors in which they are transmitted. At same time, the overall cable diameter should be as small as possible to reduce cable weight and increase flexibility for better handling and operation. However, the smaller the area (diameter) of the current carrying cross section of a conductor in the charging cable is, the higher the temperature raises during operation as more current has to, be transmitted by the available area. One way to address this problem is to actively cool the conductors. One successful solution is presented in the above mentioned WO17133893A1 of the same applicant.

To realize comparably small copper cross sections, the conductors must be effectively cooled with a cooling liquid which is circulating in a cooling circuit. One object of the present disclosure is to provide an optimized charging cable which is less expensive in production and which offers, compared to the prior art, better charging performance. Parameters which are in favor of the performance of the charging cable are large copper cross section (area), large coolant passage cross-section (area), large inner circle radius, smooth surface of the coolant channel, less flow resistance, avoidance of selective heat accumulation.

The liquid cooled cable according to the disclosure is preferably arranged in a charging cable for an electric vehicle to transport electric current to the electric vehicle to charge the electric vehicle. The charging cable usually comprises at the vehicle's end a connector by which it is interconnected to the vehicle during charging. The charging cable and the connector forming a charging cable assembly. The connector is preferably cooled itself to prevent negative local heating of the connector. In a preferred variation, a charging cable according to the present disclosure comprises a first and a second liquid cooled cable which usually have a similar design for balanced transportation of the current and prevent unwanted local heating. The first and the second liquid cooled cable are usually arranged in an outer hose which helps to protect the first and the second liquid cooled cable against outer influences during operation. Depending on the design of the charging cable, a flow hose may be arranged additionally in the outer hose. Thereby it becomes e.g. possible, to feed cooling liquid into the connector by which the charging cable is interconnected to the vehicle during charging to cool the connector. The cooling liquid is then returned in the liquid cooled cables, preferably from the vehicle to the charging station. Depending on the field of application, two liquid cooled cables can share a common flow hose. Alternatively or in addition, each liquid cooled cable may comprise its own flow hose. This may become appropriate, if each conductor must be controlled individually. Furthermore, the charging cable may comprise a ground wire and/or at least one or several data lines to transmit information along the charging cable.

A liquid cooled cable according to the disclosure usually comprises a conductor which comprises at least two cable strands. Good results can be achieved, when the cable strands of the conductor are encompassed by a stable, self-supporting hose, which in a cross-sectional view is spaced at least partially apart from the cable-strands by an interstitial space arranged between an inner wall of the hose and the cable strands of the conductor. Depending on the shape of the cable in space, the interstitial space along the cable may be variable with respect to the conductor. The cable strands of the conductor can be arranged laterally displaceable in the hose, such that on one side they are position-dependent in contact with the inner wall of the hose, while on the opposite side they are spaced apart from the inner wall of the hose. The inner diameter of the hose is preferably larger than the outer diameter of the conductor as will be explained in more detail hereinafter.

The interstitial space is foreseen to conduct a cooling liquid, e.g. in the form of an oil or another appropriate cooling fluid, along the conductor. Good results are achieved when the cooling liquid is in direct contact with the outer wires of the cable strands. However, if appropriate, the cable strands can be covered by a sheet, as long as cooling is not hindered in a negative manner. For obtaining reliable and robust results, the at least two cable strands are stranded with respect to each other in a helical manner in a longitudinal direction of the conductor. As a result, the interstitial space which is defined by the strands of the conductor and the inner wall of the hose, are also helically shaped forcing the cooling liquid on a helical path around a center of the conductor. Preferably the inner wall of the hose is smooth, thereby not negatively increasing resistance and supporting a linear flow of the cooling liquid along the conductor. Usually, each cable strand consists of a bundle of wires stranded with respect to each other. To obtain a higher current carrying cross-section, the wires of a strand may be mechanically compressed with respect to each other. Good results can be e.g, achieved by rotary swaging and/or drawing the bundle of wires through an appropriate die compacting the wires accordingly. At a minimum, the conductor may comprise two cable strands in a cross-section being spaced by 180° apart from each other with respect to a center of the conductor. Preferably the conductor comprises three cable strands in a cross-section being spaced by 120° apart from each other with respect to the center of the conductor. If appropriate, the at least two cable strands may be spaced apart from each other by a spacer arranged in a longitudinal direction between them. As the spacer positions the cable strands further apart from each other, it would be possible to increase the surface of the conductor which is in contact with the cooling liquid, although the spacer may have a negative impact on the current carrying cross-section. If appropriate, the spacer can be made from conductive material itself.

The hose preferably comprises an essentially circular cross-section offering an even distribution of the cooling liquid around the cable strands of the conductor. Depending on the field of application, other shapes of cross-sections may be appropriate. To avoid unwanted deformation of the interstitial space, the hose is usually self-supporting, Alternatively, or in addition, it can be encompassed by a supporting structure, e.g. in the form of a spiral coil e.g, made from spring steel, maintaining the cross-section when lateral forces occur or during bending. As mentioned above, good results can be achieved, when the conductor is at least to a certain extend arranged laterally movable with respect to the hose resulting in a variable interstitial space. The length of twist of the cable strands is preferably in the range of 7 to 15 times the diameter of an envelope curve of the corresponding conductor. Furthermore, the diameter of the inner wall of the hose is preferably in the range of 5% to 15% bigger than the diameter of an envelope curve of the corresponding conductor. In both cases, depending on the field of application, other values may be possible. In a preferred variation, the charging cable comprises two liquid cooled cables arranged essentially adjacent to each other. In addition, the charging cable may comprise a flow hose for the cooling liquid. For better protection, the charging cable usually comprises an outer hose.

Method for making of a liquid cooled cable usually comprises the following method steps. Providing a conductor comprising at least two cable strands. Encompassing the conductor by a hose preferably extruded over the at least two cable strands in a continuous manner spaced in a sectional view at least partially apart from the conductor by an interstitial space. Such that the interstitial space is arranged between an inner wall of the hose and the cable strands of the conductor. The at least two cable strands are during production preferably stranded with respect to each other in a helical manner in a longitudinal direction of the conductor before the hose is applied. If appropriate, the wires of at least one cable strand can be mechanically compressed with respect to each other before the hose is extruded over the at least two cable strands. Good results can be achieved e.g. by rotary swaging and/or a die. The hose is preferably extruded over the cable strands in a continuous manner, e.g. by a respective nozzle arranged coaxially with respect to the conductor of at least two cable strands.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
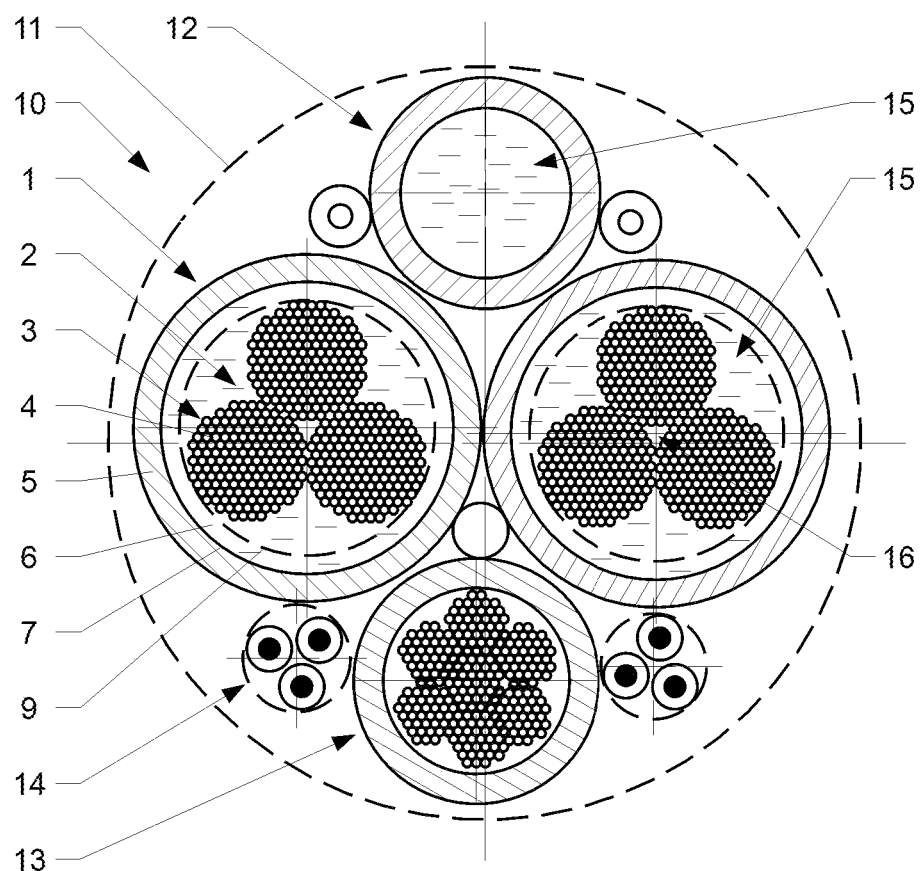
FIG. 1 is a variation of a cross-section of a charging cable according to the disclosure.
Figure 2:
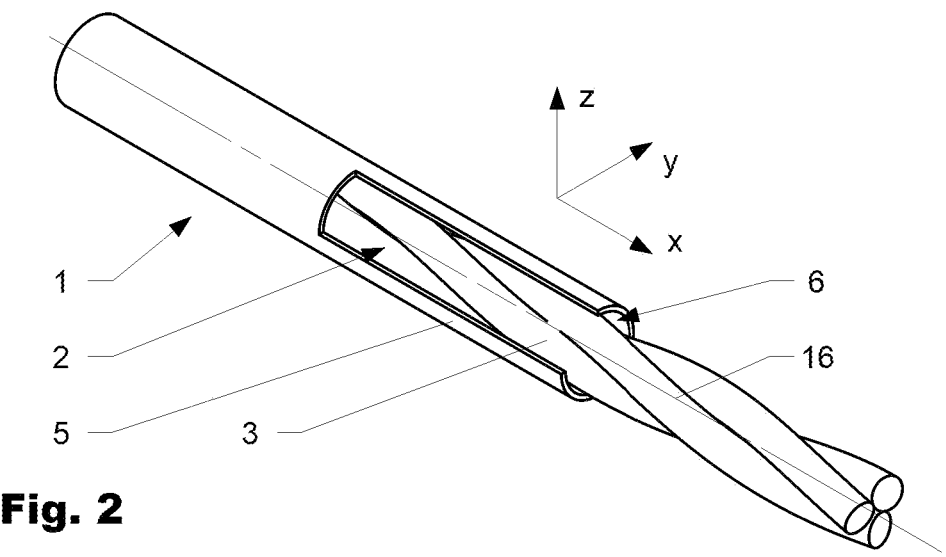
FIG. 2 is a perspective view of a first variation of a liquid cooled cable according to the disclosure.
Figure 3:
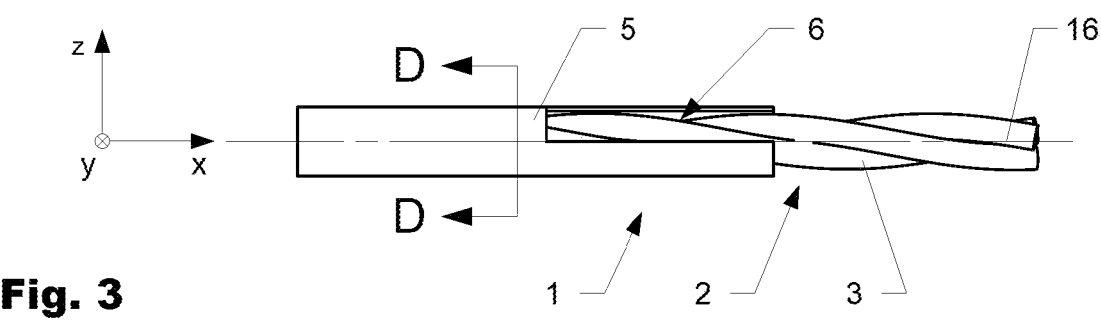
FIG. 3 is a side view of the liquid cooled cable according to FIG. 2.
Figure 4:
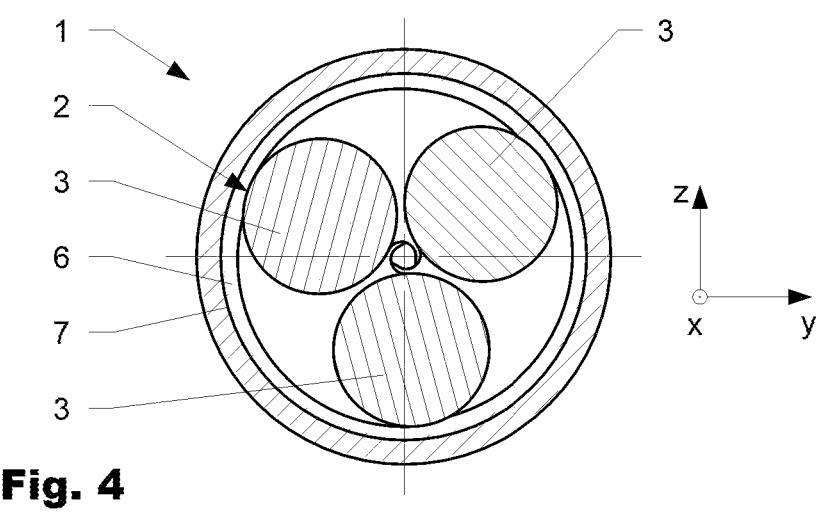
FIG. 4 is a section view along section line DD according to FIG. 3.
Figure 5:
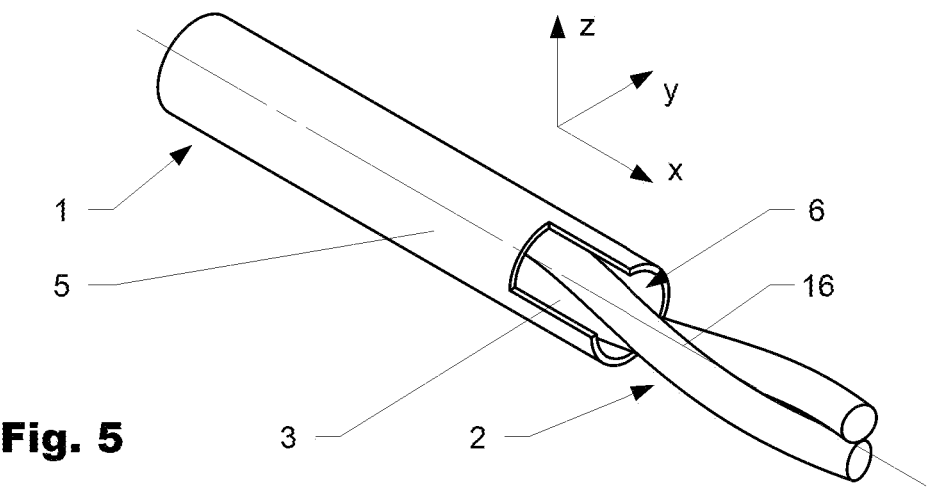
FIG. 5 is a perspective view of a second variation of a liquid cooled cable according to the disclosure.
Figure 6:
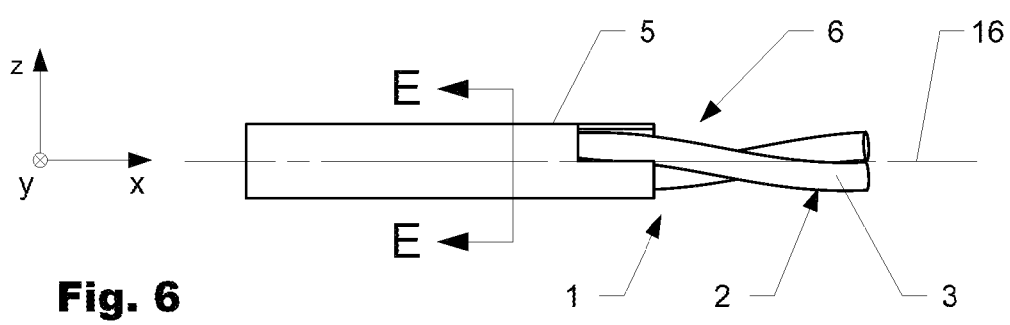
FIG. 6 is a side view of the liquid cooled cable according to FIG. 5.
Figure 7:
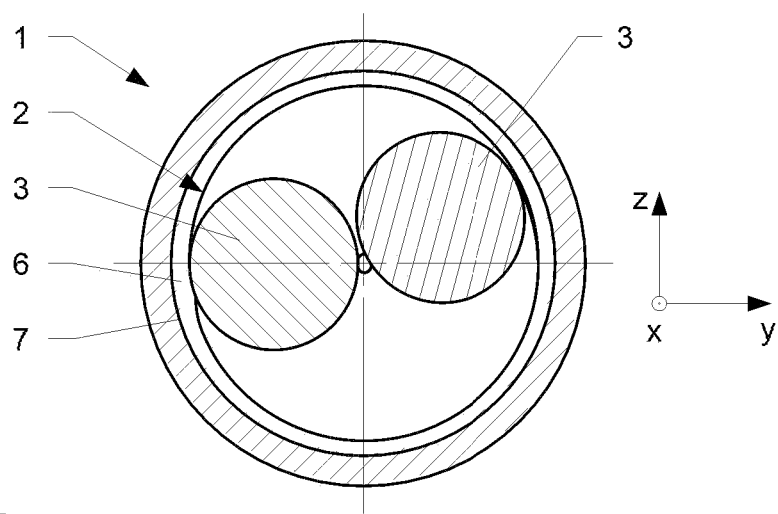
FIG. 7 is a section view along section line DD according to FIG. 6.

FIG. 1 shows a variation of a charging cable 10 according to the disclosure. FIG. 2 shows a first variation of a liquid cooled cable 1 according to the disclosure in a perspective view. FIG. 3 shows the liquid cooled cable 1 according to FIG. 2 in a side view and FIG. 4 shows a section view of the liquid cooled cable 1 according to section line DD of FIG. 3. FIG. 5 shows a second variation of a liquid cooled cable 1 according to the disclosure in a perspective view. FIG. 6 shows the liquid cooled cable 1 according to FIG. 5 in a side view and FIG. 7 shows a section view of the liquid cooled cable 1 according to section line DD of FIG. 6.

In a variation, a charging cable 10 according to the present disclosure usually comprises a first and a second liquid cooled cable 1 which usually have a similar design. The liquid cooled cables 1 are foreseen to transport electric current to an electric vehicle (not shown in detail) to charge the electric vehicle. The first and the second liquid cooled cable 1 are arranged in an outer hose 11 which help to protect the first and the second liquid cable against outer influences during operation. As shown in in FIG. 1, a flow hose 12 may be arranged in the outer hose 11 to return cooling liquid 15 flowing in the liquid cooled cables 1 as described hereinafter in more detail. Depending on the field of application, two liquid cooled cables 1 can share a common flow hose 12. Alternatively or in addition, each liquid cooled cable 1 may comprise its own flow hose 12. If necessary, the charging cable 10 may comprise a ground wire 13 and/or at least one data line 14 to transmit information along the charging cable 10.

A liquid cooled cable 1 according to the present disclosure usually comprises a conductor 2 which comprises at least two cable strands 3. The cable strands 3 of the conductor 2 are encompassed by a hose 5. In a cross-sectional view, they are usually spaced at least partially apart from the hose 5 by an interstitial space 6 arranged between an inner wall 7 of the hose 5 and the cable strands 3 of the conductor 2. The interstitial space 6 is foreseen to conduct a cooling liquid 15 along the conductor 2. Good results can be achieved when the cooling liquid 15 is in direct contact with the outer wires 4 of the cable strands 3. Usually, the at least two cable strands 3 are stranded with respect to each other in a helical manner in a longitudinal direction x of the conductor 2. As a result, the interstitial space 6 which is defined by the strands 3 of the conductor 2 and the inner wall 7 of the hose 5, are also helically shaped forcing the cooling liquid 15 on a helical path around a center 16 of the conductor 2. Preferably the inner wall 7 of the hose 5 is flat thereby supporting a linear flow of the cooling liquid 15. Preferably, the cable strands 3 each consist of a bundle of wires 4 stranded with respect to each other. To obtain a higher area current carrying cross-section, the wires 4 of a strand 3 may be mechanically compressed with respect to each other. Preferably, the conductor 2 comprises two cable strands 3 in a cross-section being spaced by 180° apart from each other with respect to a center 16 of the conductor 2 or three cable strands 3 in a cross-section being spaced by 120° apart from each other with respect to the center 16 of the conductor 2. If appropriate, the at least two cable strands 3 may be spaced apart from each other by a spacer (not shown in detail) arranged in a longitudinal direction between them. Thereby it would be possible to obtain a more even internal cooling, Preferably, the hose 5 comprises an essentially circular cross-section offering an even distribution of the cooling liquid 15. Depending on the field of application, other shapes of cross-sections may be appropriate. The hose 5 is preferably self-supporting. Alternatively, it can e.g. be encompassed by a supporting structure, e.g. in the form of a spiral coil made from spring steel, maintaining the cross-section when lateral forces occur or during bending. Good results can be achieved, when the conductor 2 is arranged laterally movable with respect, to the hose 5 resulting in a variable interstitial space 6. The length of twist of the cable strands 3 is preferably in the range of 7 to 15 times the diameter of an envelope curve 9 of the corresponding conductor 2. Furthermore, the diameter of the inner wall 7 of the hose 5 is preferably in the range of 5% to 15% bigger than the diameter of an envelope curve 9 of the corresponding conductor 2. In both cases, depending on the field of application, other values may be possible. In a preferred variation, the charging cable 10 comprises two liquid cooled cables 1 arranged adjacent to each other. In addition, the charging cable 10 may comprise a flow hose 12 for the cooling liquid 15. For better protection, the charging cable 10 comprises an outer hose 11.

The words used in the specification are words of description rather than limitation, and it is understood that various changes may be made without departing from the spirit and the scope of the disclosure It is claimed:

1. A liquid cooled cable (1) comprising:
   a. a conductor (2) including at least two cable strands (3), wherein the at least two cable strands (3) comprise wires (4) stranded with respect to each other, wherein the wires (4) of a cable strand (3) are mechanically compressed with respect to each other, thereby increasing a higher area current carrying cross-section, wherein the wires (4) comprise copper;
   b. the conductor (2) encompassed by a hose (5) spaced at least partially apart from the conductor (2) by an interstitial space (6) arranged between an inner wall (7) of the hose (4) and the cable strands (3) of the conductor (2), wherein the inner wall (7) of the hose (5) comprises a diameter in the range of 5% to 15% bigger than a diameter of an envelope curve (9) of the corresponding conductor (2);
   c. the interstitial space (6) including a cooling liquid (15) in the hose (5) along the conductor (2).

2. The liquid cooled cable (1) according to claim 1, wherein the at least two cable strands (3) are stranded with respect to each other in a helical manner in a longitudinal direction (x) of the conductor (2).

3. The liquid cooled cable (1) according to claim 1, wherein the conductor (2) comprises one of:

a. two cable strands (3) in a cross-section being spaced by 180° apart from each other with respect to a center (16) of the conductor (2); and b. three cable strands (3) in a cross-section being spaced by 120° apart from each other with respect to the center (16) of the conductor (2).

4. The liquid cooled cable (1) according to claim 1, wherein the at least two cable strands (3) are spaced apart from each other by a spacer.

5. The liquid cooled cable (1) according to claim 1, wherein the hose (5) comprises an essentially circular cross-section.

6. The liquid cooled cable (1) according to claim 1, wherein the hose (5) is self-supporting.

7. The liquid cooled cable (1) according to claim 1, wherein the conductor (2) is arranged laterally movable with respect to the hose (5) resulting in a variable interstitial space (6).

8. The liquid cooled cable (1) according to claim 1, wherein the length of twist of the cable strands (3) is in the range of 7 to 15 times a diameter of an envelope curve (9) of the corresponding conductor (2).

9. A charging cable (10) comprising at least one liquid cooled cable (1) according to claim 1.

10. The charging cable (10) according to claim 9, wherein the charging cable (10) comprises two liquid cooled cables (1) arranged adjacent to each other.

11. The charging cable (10) according to claim 9, wherein the charging cable (10) comprises a flow hose (12) for the cooling liquid (15).

12. The charging cable (10) according to claim 9, wherein the charging cable (10) comprises an outer hose (11).

13. A method for making of a liquid cooled cable (1) comprising the following steps:

a. providing a conductor (2) including at least two cable strands (3), the at least two cable strands (3) including wires (4) stranded with respect to each other, wherein the wires (4) of a cable strand (3) are mechanically compressed with respect to each other, thereby increasing a higher area current carrying cross-section, wherein the wires (4) comprise copper;

b. encompassing the conductor (2) with a hose (5) extruded over the at least two cable strands (3) in a continuous manner spaced at least partially apart from the conductor (2) by an interstitial space (6) arranged between an inner wall (7) of the hose (5) and the cable strands (3) of the conductor (2), wherein the inner wall (7) of the hose (5) comprises a diameter in a range of 5% to 15% larger than a diameter of an envelope curve (9) of the corresponding conductor (2); and c. conducting a cooling liquid (15) within the interstitial space (6) in the hose (5) along the conductor (2).

14. The method according to claim 13, wherein the at least two cable strands (3) during production are stranded with respect to each other in a helical manner in a longitudinal direction (x) of the conductor (2).

15. The method according to claim 13, wherein the wires (4) of at least one cable strand (3) are mechanically compressed with respect to each other before the hose (5) is extruded over the at least two cable strands (3).

* * * * *